United States Patent
Palmer et al.

(10) Patent No.: US 7,220,355 B2
(45) Date of Patent: May 22, 2007

(54) EVAPORATIVE COOLER PUMP STRAINER

(75) Inventors: Roger C. Palmer, Scottsdale, AZ (US); Donald L. Townsend, Phoenix, AZ (US)

(73) Assignee: AdobeAir, Inc., Phoenix, AZ (US)

( * ) Notice: Subject to any disclaimer, the term of this patent is extended or adjusted under 35 U.S.C. 154(b) by 231 days.

(21) Appl. No.: 10/932,765

(22) Filed: Sep. 2, 2004

(65) Prior Publication Data
US 2006/0043015 A1 Mar. 2, 2006

(51) Int. Cl.
F04D 29/70 (2006.01)
B01D 29/11 (2006.01)

(52) U.S. Cl. ................. 210/416.1; 210/232; 415/121.2

(58) Field of Classification Search ................. 210/232, 210/416.1, 416.2, 416.3, 416.4, 416.5; 415/121.2
See application file for complete search history.

(56) References Cited

U.S. PATENT DOCUMENTS

| | | | | |
|---|---|---|---|---|
| 898,499 A | * | 9/1908 | O'Donnell | 417/424.1 |
| 2,924,179 A | * | 2/1960 | Isaksson | 415/121.2 |
| 3,029,744 A | * | 4/1962 | Goettl | 415/121.2 |
| 3,041,978 A | * | 7/1962 | Kranz | 415/121.2 |
| 3,046,900 A | | 7/1962 | Pollak | |
| 3,478,690 A | * | 11/1969 | Helke et al. | 415/121.2 |
| 3,487,935 A | * | 1/1970 | Lovitz | 210/169 |
| 3,606,567 A | * | 9/1971 | Stahle | 415/47 |
| 3,957,402 A | * | 5/1976 | Sloan | 417/367 |
| 3,972,647 A | * | 8/1976 | Niedermeyer | 417/2 |
| 4,353,846 A | * | 10/1982 | Mehrens et al. | 261/4 |
| 4,752,388 A | * | 6/1988 | Ng | 210/169 |
| 4,856,971 A | | 8/1989 | Koble, Jr. | |
| 4,994,177 A | * | 2/1991 | Bogar, Jr. | 210/167 |
| 5,006,238 A | * | 4/1991 | Tominaga | 210/169 |
| 5,294,335 A | * | 3/1994 | Chiang | 210/169 |
| 6,200,487 B1 | * | 3/2001 | Denkewicz et al. | 210/749 |

FOREIGN PATENT DOCUMENTS

JP 62-32299 * 2/1987

* cited by examiner

Primary Examiner—Fred G. Prince
(74) Attorney, Agent, or Firm—Foley & Lardner LLP

(57) ABSTRACT

A strainer for a water pump includes a bottom panel and an upwardly extending side panel forming a cavity. The base of the water pump is received within the cavity and is removably secured to the filter.

18 Claims, 4 Drawing Sheets ic COOLER PUMP STRAINER

CROSS-REFERENCE TO RELATED PATENT APPLICATIONS

None.

BACKGROUND OF THE INVENTION

The present invention relates generally to the field of water pump filters and more particularly, to a removable strainer for an evaporative cooler.

Evaporative coolers are well know and used in warm arid climates to cool the air. Conventional evaporative coolers work by drawing air from outside through a rigid media soaked with water. As the air flows through the media soaked with water, the water is evaporated by the outside air thereby lowering the temperature of the air. The cooled air is then directed into the area to be cooled.

Conventional evaporative coolers include a number of elements stored in a housing. These elements typically include an air blower, a media pad, a water distribution system, and an electric motor. The water distribution system includes a water pump that draws water from a collection pan in the bottom of the housing and pumps the water through tubing to the top of the media pad or pads. Some of the water in the media pads is evaporated as air is drawn through the media. The remaining water that is not absorbed in the media returns to the collection pan in the bottom of the housing. In this manner the water is recirculated. Fresh water is added only to replace the water that has been evaporated.

It is not desirable to circulate any debris, that may fall into the collection pan. The debris can both clog the pump and/or the media. Debris may fall into the housing during installation of the evaporative cooler or during replacement of the media. Additionally, since the water is being recirculated any minerals in the water tend to build up overtime in the collection pan. One method of removing the mineral buildup is to intentionally replace the water in the collection pan on a periodic basis. To minimize debris from entering the water pump a filter or strainer may be used. One such filter or strainer is disclosed in U.S. Pat. No. 3,046,900 issued on Jul. 31, 1962 to Pollak which illustrates a two piece filter element that fits on top of a portion of the pump. Since this filter only covers the top of a base portion of the of the water pump, debris that is on the bottom of the collection pan may still enter the pump.

Another attempt to introduce a filter is disclosed in U.S. Pat. No. 4,856,971 issued on Aug. 15, 1989 to Koble. The filter disclosed in Koble includes a number of thin slits that are formed directly through the lower portion of the base. Similarly, Koble does not filter any debris located on the base of the pan.

Since, the collection pan is typically not completely planar debris is able to enter below the lower edge of the housing. As soon as an opening exists between the lower edge of the water pump and the collection pan, debris can enter this opening and be circulated by the pump and/or clog the pump. Additionally, since the slits are part of the pump itself if the slits become clogged it is necessary to remove the entire pump in order to clean the filter portion.

Accordingly, there is a need for a filter for a water pump that filters out debris located on the bottom of the collection basin. There is also a need for a filter that can be easily removed from the water pump housing for cleaning and or replacement.

SUMMARY OF THE INVENTION

One embodiment of the invention relates to a strainer for a water pump. The strainer includes a bottom panel and an upwardly extending side panel forming a cavity. The base of the water pump is received within the cavity and is removably secured to the filter.

Another embodiment of the invention relates to a strainer for an evaporative cooler pump. The strainer includes a bottom panel including a plurality of slits extending therethrough and an upwardly extending side panel having a plurality of slits extending therethrough. The bottom panel and side panel define a cavity configured to receive a portion of the water pump within the cavity.

A further embodiment of the invention relates to a method of releasably securing a strainer to a pump filter. A strainer is provided having a bottom panel having an outer periphery. The strainer includes a side wall extending upwardly from the bottom panel about the periphery. The bottom panel and side wall defining a cavity. A water pump is provided having a base portion. The base portion of the water pump is placed within the cavity of the strainer. The base portion and strainer are operatively secured to one another.

In a further aspect of the invention, the strainer is operatively connected and removed form the water pump without the use of tools.

DETAILED DESCRIPTION OF THE PREFERRED EMBODIMENTS

Figure 1:
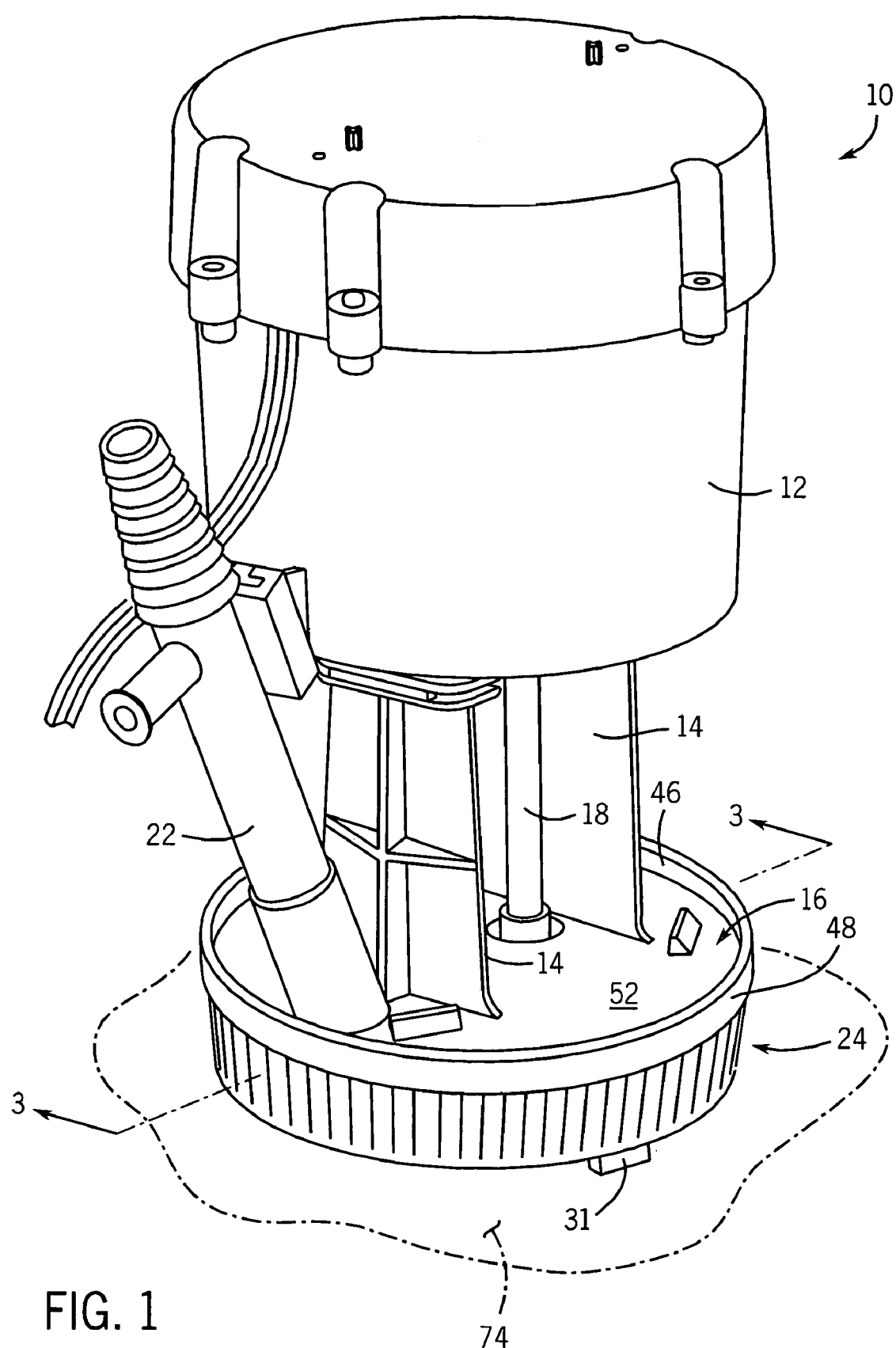
FIG. 1 is an isometric view of a water pump and filter.

Referring to FIG. 1, a water pump 10 for an evaporative cooler includes a housing 12 in which a motor is located. A pair of supports 14 separate the motor housing 12 from a base 16. A shaft 18 operatively driven by the motor located within motor housing 12 drives pump impeller 20. Water is pumped upward through guide 22 to a distribution system (not shown). A filter or strainer 24 is releasably secured to base 16.

Figure 2:
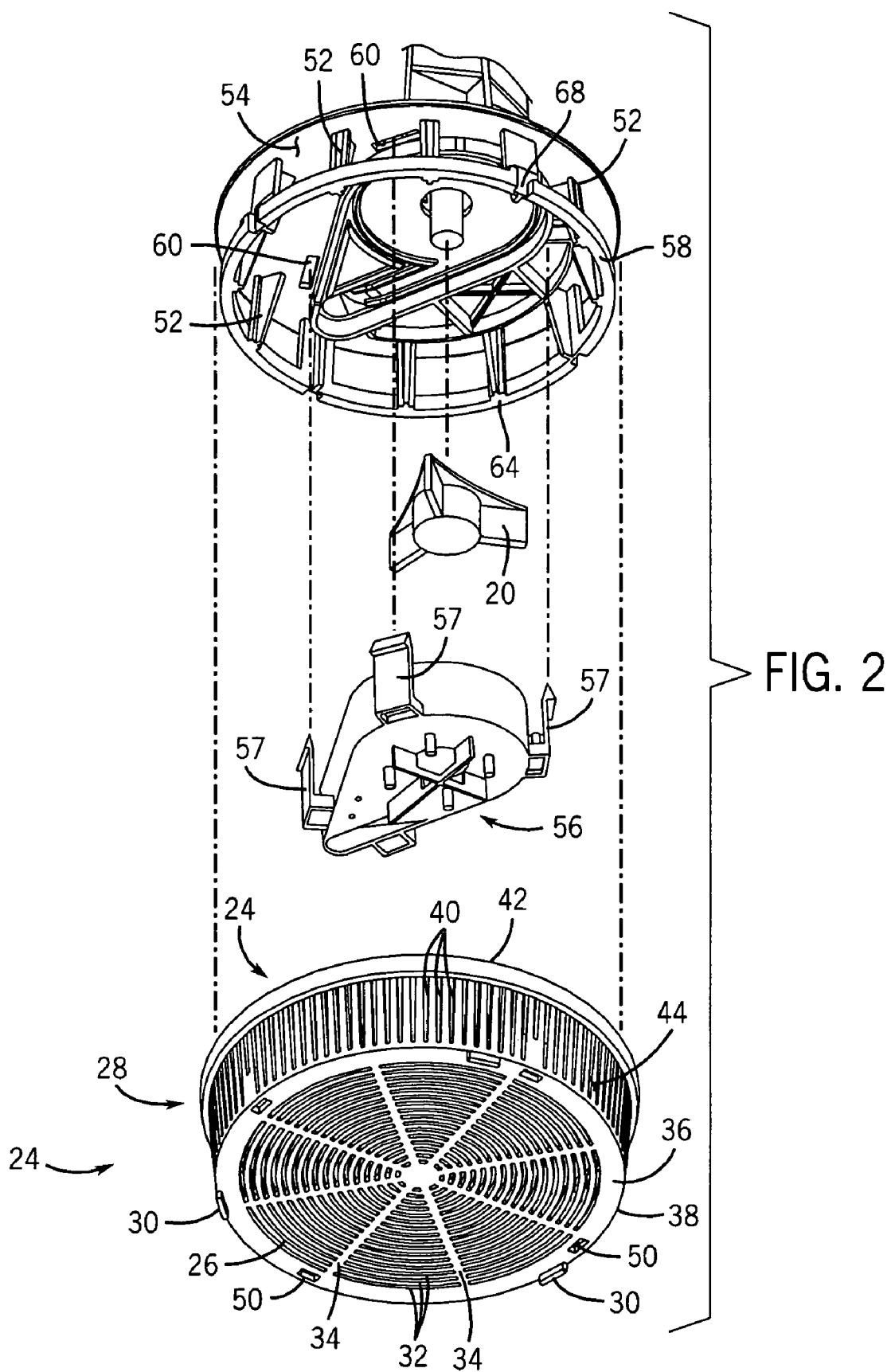
FIG. 2 is an exploded view of the filter and base of the water pump.

Referring to FIG. 2, strainer 24 includes a bottom panel 26 and an upwardly extending side wall 28. Bottom panel 26 may include feet 30 extending downwardly there from that rest upon the housing surface or a collection pan within the housing. Bottom panel 26 includes a plurality of arcuate slits 32 that are separated by a plurality of radial members 34. Of course slits 32 may be other shapes as well. For example slits 32 may be straight or other fanciful shape. The slits may extend in parallel lines or may extend in a radial fashion from a center 36 of the bottom panel 26. Bottom panel 26 further includes a solid perimeter region 36 extending about its periphery 38. Feet 30 extend from perimeter region 36 proximate the periphery 38.

Figure 3:
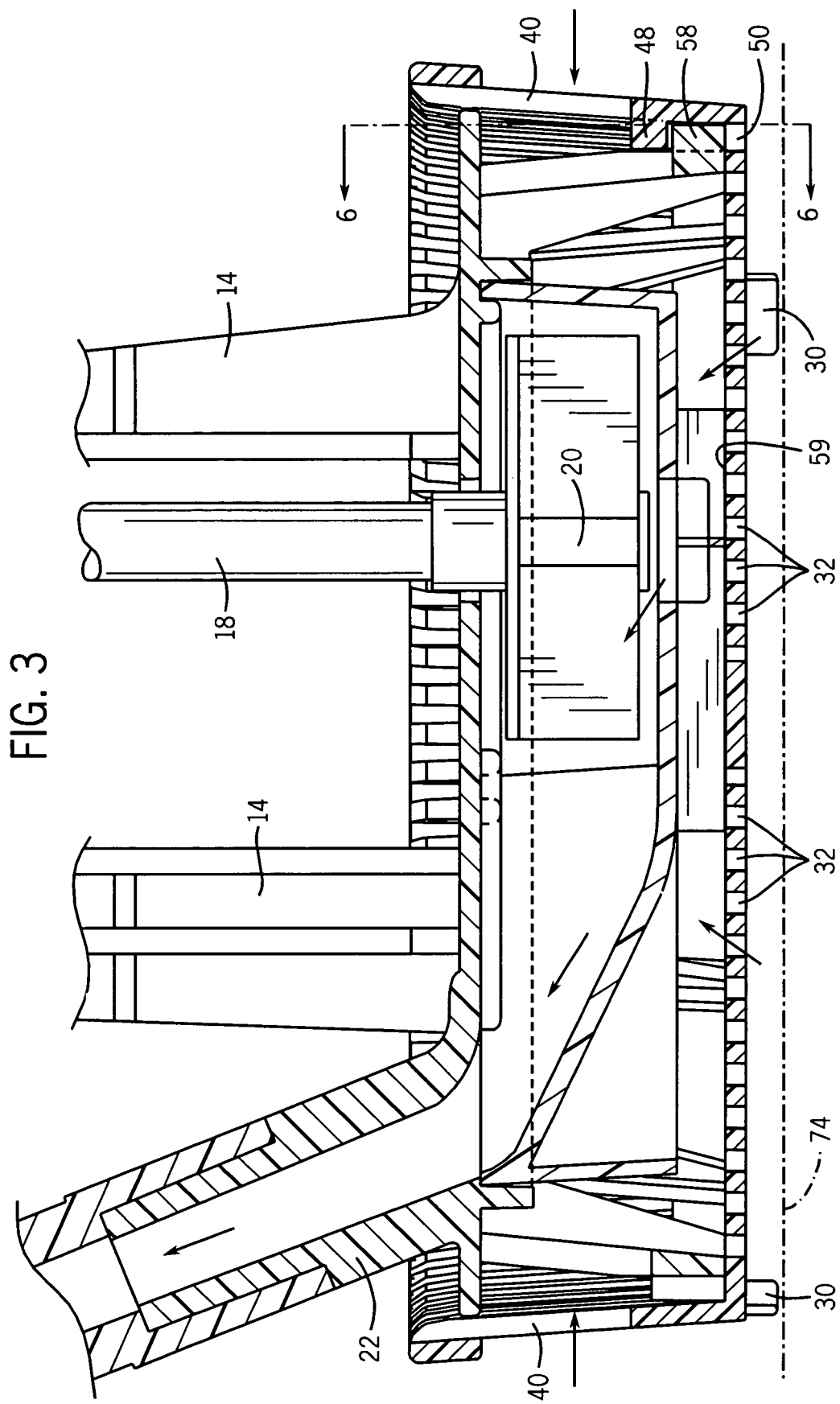
FIG. 3 is cross-sectional view of the water pump and filter taken generally along the lines 3—3 of FIG. 1.

Side wall 28 extends upwardly from bottom panel 26 proximate periphery 38. Side wall 28 includes a plurality of slits 40 extending between periphery 38 of bottom panel 26 and an upper edge 42. Side wall 28 includes an exterior surface 44 and an opposing inner surface 46. Extending inwardly from inner surface 46 are four tabs 48. In one embodiment, there is no slit through side wall 28 in the region between the base plane 26 and tab 48. Referring to FIGS. 2 and 3 base plane 26 includes an opening 50 located directly below each tab 48. Opening 50 facilitates the manufacture of the strainer 24, when the strainer 24 is formed in a mold from a material such as plastic.

Referring to FIGS. 2 and 3 base 16 includes feet 52 extending downwardly from a separator member 54. Shaft 18 extends through an opening 56 located in separator member 54 and is operatively connected to impeller 20. An impeller housing 56 supports impeller 20 and is secured to separator member 54 by the insertion of beveled supports 57 that extend through openings 60 in separator member 54.

Figure 4:
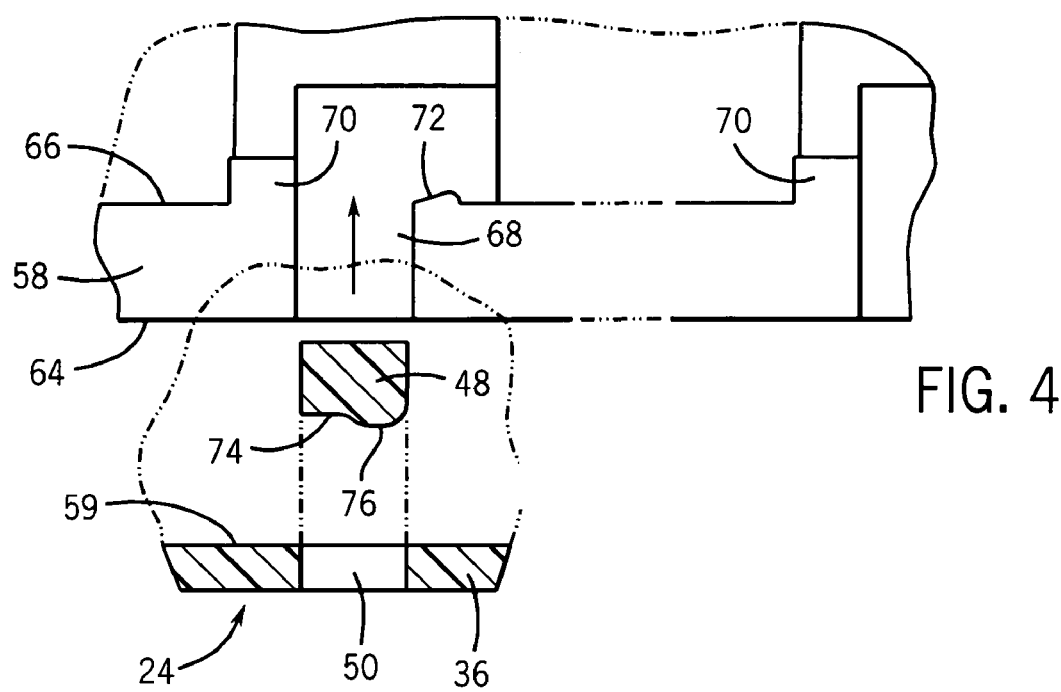
FIG. 4 is a partial cross sectional and exploded view of the filter being directed upwardly toward the water pump housing taken generally along lines 6—6 of FIG. 3.
Figure 5:
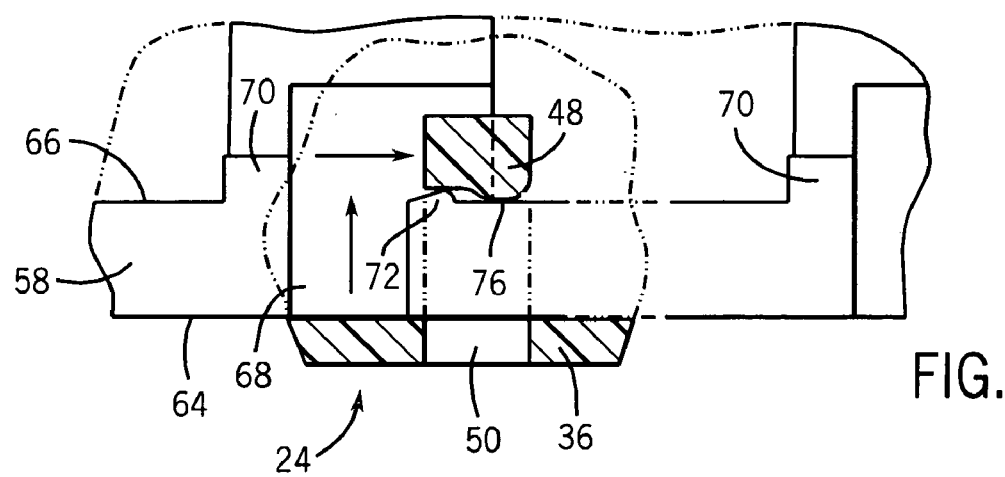
FIG. 5 is a partial cross sectional view of the filter being located within the water pump housing in the engaged position and taken generally along lines 6—6 of FIG. 3.
Figure 6:
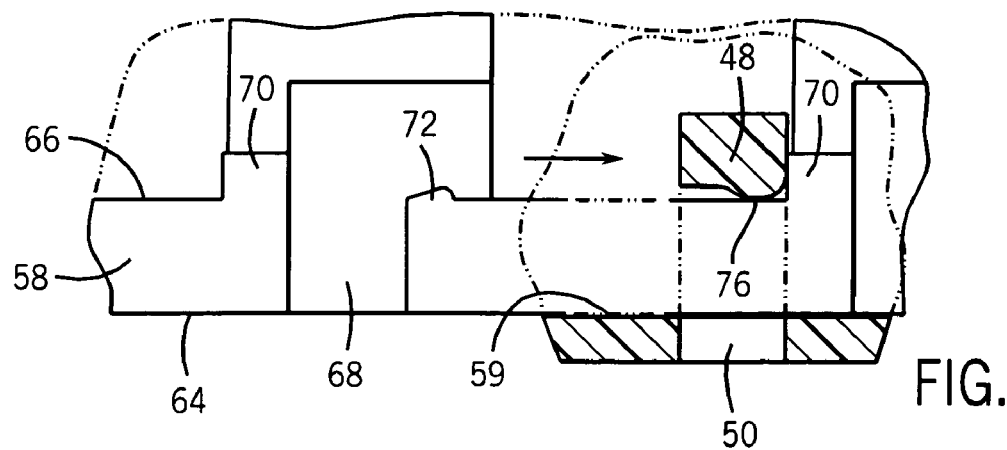
FIG. 6 is a partial cross sectional view of the filter in the fully engaged position and taken generally along lines 6—6 of FIG. 3.

Base 16 includes a lower radial support ring 58 having a bottom surface 64 and a top surface 66. Four openings or grooves 68 extend through support ring 58 from bottom surface 64 to top surface 66. Extending from the top surface 66 proximate one side of opening 68 is a stop 70. Extending upwardly from top surface 66 on the other side of the openings 68 is a beveled raised guide member 72. Guide member 72 extends upwardly 0.050 inches. Referring to FIGS. 4-5 tab 48 includes a lower surface 74 having a downwardly extending bump or ridge 76 located on one side of the lower surface. Strainer 24 is secured to base 16 by aligning tabs 48 with grooves 68, Strainer 24 is then moved toward base 16 until the bottom surface 64 of radial ring 58 contacts the inner surface 59 of bottom panel 26 or until tabs 48 clear the upper surface of support ring 58. Strainer 24 is then rotated clockwise relative to base 16 such that tab 48 extends over beveled guide 72. Strainer 24 is rotated until tab 48 contacts a stop 70 proximate an adjacent opening 68. Tab 48 rests on the upper surface 66 of radial ring 58 thereby securing the strainer to the base 16. Alternatively, in an operative position radial support ring 58 rests on the inner surface of the bottom plate of the strainer. If the pump filter is raised upwardly, tabs 48 will contact the upper surface of the radial support ring 58 thereby securing the strainer to the water pump.

Referring to FIG. 3 water pump 10 rests on strainer 24 which in turn rests on the collection pan or housing 74. Feet 30 raise the strainer off of the collection pan or housing to facility the free flow of water into the pump through opening slits 32 on the base plate 26 and through opening slits 40 on the side wall.

Strainer 24 may be removed from base 16 by simply rotating strainer 24 counterclockwise relative to base 16 until tab 48 is located over groove or opening 68 at which point the strainer is lowered until tab 48 is free of groove 68. In this manner the strainer may cleaned and replaced or a new strainer may be attached.

In this embodiment, no tools are required to assemble or remove the strainer 24 from the base 16. This reduces the time of assembly and further reduces the parts required for the water pump as a whole thereby reducing costs as well. In another embodiment strainer 24 may be secured to housing 16 with a separate fastener that is known in the art. Such fasteners may or may not require a tool. For example the use of screws would require a screw driver both to attach and remove the strainer from the housing.

It is important to note that the construction and arrangement of the elements of the strainer and water pump as shown in the preferred and other exemplary embodiments is illustrative only. Although only a few embodiments of the present invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the claims. For example, a tab could be located on the base instead of the strainer and similarly, the radial ring and grooves may be located on the strainer. Additionally, other types of mechanical fastening means may be used to releasably secure the strainer to the base. For example, the strainer may be snap fit to the water pump such that a portion of the strainer and water pump deform or bend as the strainer and water pump are being engaged and then the portion snap backs to its original shape to secure the strainer and water pump to one another. In this manner the strainer and water pump remain attached to one another until a sufficient force is applied to remove the two components from one another. Additionally, in a preferred embodiment filter or strainer 24 is a unitary component. However, multiple piece strainers may be used. Further, strainer 24 may be formed with an anti-microbial additive. The anti-microbial additive may formed with the plastic or other material, or the anti-microbial additive may be applied to the surface of the finished product. The use of an anti-microbial additive helps retard the growth around the strainer and therefore helps prevent plugging of the strainer itself. Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the spirit of the present invention as expressed in the appended claims.

What is claimed is:

1. A water pump comprising:
   a pump having a base; and
   a one-piece filter having a bottom panel with slits substantially covering the bottom panel and an upwardly extending side panel with vertically extending slits forming a cavity, the base being received within the cavity and being removably secured to the filter, the side panel substantially covering the base when the base is located in the cavity.

2. The water pump of claim 1, wherein the base includes a bottom surface that is located proximate an upper surface of the bottom panel of the filter, and the side panel of the filter extends upwardly about a lower portion of the base.

3. The water pump of claim 2, wherein the filter and base are releasably secured with a mechanical fastener that can be released without a tool.

4. A water pump comprising:
   a pump having a base:
   a filter having a bottom panel with slits substantially covering the bottom panel and an upwardly extending side panel with slits forming a cavity, the base being received within the cavity and being removably secured to the filter;

the base including a bottom surface located proximate an upper surface of the bottom panel of the filter, the side panel of the filter extending upwardly about a lower portion of the base; and the bottom panel includes a plurality of slits;

wherein the filter includes at least one tab extending into the cavity, the base including a lower edge with an opening for receiving the tab, the filter being coupled to the base, by rotating the filter and the base relative to one another and engaging the tab within a portion of the base.

5. The water pump of claim 4, filter includes a plurality of feet extending downwardly from the bottom panel configured to support the filter and pump.

6. The water pump of claim 4, wherein the base includes an annular ring defining the lower edge of the base, the annular ring being supported by at least two extensions, the annular ring having an upper surface that supports the tab in the engaged position.

7. The water pump of claim 6, wherein the upper surface of the annular ring includes an upwardly extending stop member to prohibit the tab from being moved beyond the stop.

8. The water pump of claim 7, wherein the slits are less than 0.1 inches wide.

9. A strainer for a water pump comprising:
a bottom panel including a plurality of slits extending therethrough and an upwardly extending side panel having a plurality of slits extending therethrough, the bottom panel and side panel being formed as a single piece and defining a cavity configured to receive a portion of the water pump within the cavity; and having means for releasably securing the water pump proximate the bottom panel distal an upper edge of the side panel.

10. The strainer of claim 9, wherein the bottom panel is circular and having an outer periphery, the side wall extending upwardly about the periphery.

11. The strainer of claim 10, wherein the slits are 0.07 inches wide.

12. A strainer for a water pump comprising:
a bottom panel including a plurality of slits extending therethrough and an upwardly extending side panel having a plurality of slits extending therethrough, the bottom panel and side panel defining a cavity configured to receive a portion of the water pump within the cavity; and a tab extending inwardly from the side wall into the cavity and configured to operatively engage the water pump to removably secure the side wall to the water pump.

13. A method of releasably securing a strainer to a pump filter comprising:
providing a strainer having a bottom panel with slits substantially covering the bottom panel, the bottom panel having an outer periphery and a side wall extending upwardly from the bottom panel about the periphery, the bottom panel and side wall defining a cavity;
providing a water pump with a base portion;
placing the base portion of the water pump within the cavity; and
operatively securing the base portion to the strainer;
wherein one of the base and side wall of the strainer includes a tab for releasably engaging the strainer to the base.

14. The method of claim 13, wherein the tab extends from the side wall of the strainer inwardly into the cavity.

15. The method of claim 14, wherein the base includes an annular ring having an opening extending therethrough, wherein operatively securing the base portion to the strainer includes placing the tab within the opening and lowering the base into the cavity until the tab clears an upper edge of the annular ring.

16. The method of claim 15, further including rotating the strainer and base relative to one another to move the tab away from the opening in the annular ring.

17. The method of claim 16, wherein the upper edge of the annular ring includes an upwardly extending stop member, wherein the tab contacts the stop member to prohibit further rotation of the strainer relative to the water pump.

18. The method of claim 17, further including the step of removing the strainer form the water pump by rotating strainer relative to the water pump to align the tab with the opening and then moving the strainer and water pump apart to allow the tab to move through the opening.

* * * * *

UNITED STATES PATENT AND TRADEMARK OFFICE
CERTIFICATE OF CORRECTION

PATENT NO. : 7,220,355 B2  Page 1 of 1
APPLICATION NO. : 10/932765
DATED : May 22, 2007
INVENTOR(S) : Roger C. Palmer and Donald L. Townsend It is certified that error appears in the above-identified patent and that said Letters Patent is hereby corrected as shown below:

In the Claims:
Column 6:
line 38, replace "form" with --from--.

Signed and Sealed this

Twenty-seventh Day of November, 2007

JON W. DUDAS
*Director of the United States Patent and Trademark Office*